United States Patent
Shimazu et al.

(10) Patent No.: US 10,344,853 B2
(45) Date of Patent: Jul. 9, 2019

(54) HYDRAULIC SWITCH MALFUNCTION ASSESSMENT DEVICE

(71) Applicant: JATCO Ltd, Fuji-shi, Shizuoka (JP)

(72) Inventors: Takamitsu Shimazu, Isehara (JP); Youji Itou, Sagamihara (JP)

(73) Assignee: JATCO LTD, Fuji-Shi (JP)

( * ) Notice: Subject to any disclaimer, the term of this patent is extended or adjusted under 35 U.S.C. 154(b) by 552 days.

(21) Appl. No.: 15/022,627

(22) PCT Filed: Sep. 24, 2014

(86) PCT No.: PCT/JP2014/075170
§ 371 (c)(1),
(2) Date: Mar. 17, 2016

(87) PCT Pub. No.: WO2015/046189
PCT Pub. Date: Apr. 2, 2015

(65) Prior Publication Data
US 2016/0223075 A1    Aug. 4, 2016

(30) Foreign Application Priority Data

Sep. 30, 2013 (JP) .................................. 2013-203568

(51) Int. Cl.
| | |
|---|---|
| *F16H 61/12* | (2010.01) |
| *F16H 61/70* | (2006.01) |
| *F16H 61/662* | (2006.01) |

(52) U.S. Cl.
CPC ........... *F16H 61/12* (2013.01); *F16H 61/702* (2013.01); *F16H 61/66272* (2013.01); *F16H 2061/1264* (2013.01)

(58) Field of Classification Search
CPC ............. F16H 61/12; F16H 2061/1208; F16H 2061/1248; F16H 2061/1264; F16H 61/702; F16H 61/66272
See application file for complete search history.

(56) References Cited

U.S. PATENT DOCUMENTS

| 8,712,649 B2 | 4/2014 | Jozaki et al. | |
|---|---|---|---|
| 2007/0186632 A1* | 8/2007 | Endo | F16H 61/12 |
| | | | 73/115.02 |

(Continued)

FOREIGN PATENT DOCUMENTS

| EP | 2 131 071 A2 | 12/2009 |
|---|---|---|
| JP | 06-069450 U | 9/1994 |

(Continued)

OTHER PUBLICATIONS

Suehiro, Kaname, et. al. Espacenet Machine Translation of JP2000266176 Failure Diagnosing Device of Hydraulic Pressure Detecting Device. Sep. 26, 2000. (Year: 2000).*

*Primary Examiner* — Jacob S. Scott
*Assistant Examiner* — Lori Wu
(74) *Attorney, Agent, or Firm* — Foley & Lardner LLP

(57) ABSTRACT

A hydraulic switch malfunction assessment device includes a solenoid valve disposed in a hydraulic circuit of an automatic transmission and having a characteristic such that a hydraulic pressure supplied to a frictional engagement element changes due to a change in an electric current supplied to the solenoid valve, and a hydraulic switch interposed between the solenoid valve and the frictional engagement element and configured to output an ON signal when the hydraulic pressure is higher than or equal to a threshold value and output an OFF signal when the hydraulic pressure is less than the threshold value. Also provided is a controller configured to control the supplied current to a prescribed current value or less when a predetermined running condition has been met, and then assess a malfunction of the hydraulic switch, based on a state of operation of the solenoid valve and the signal from the hydraulic switch.

5 Claims, 4 Drawing Sheets

(56) References Cited

U.S. PATENT DOCUMENTS

| | | | | |
|---|---|---|---|---|
| 2008/0113839 | A1* | 5/2008 | Nozaki | F16H 61/0206 475/31 |
| 2011/0253919 | A1* | 10/2011 | Imamura | F16H 61/0251 251/129.15 |

FOREIGN PATENT DOCUMENTS

| | | | |
|---|---|---|---|
| JP | 08-258644 | A | 10/1996 |
| JP | 08-324288 | A | 12/1996 |
| JP | 2000-035115 | A | 2/2000 |
| JP | 2000-065203 | A | 3/2000 |
| JP | 2000-266176 | A | 9/2000 |
| JP | 2002-089671 | A | 3/2002 |
| JP | 2010-281343 | A | 12/2010 |
| JP | 4923080 | B2 | 4/2012 |

* cited by examiner

FIG. 2
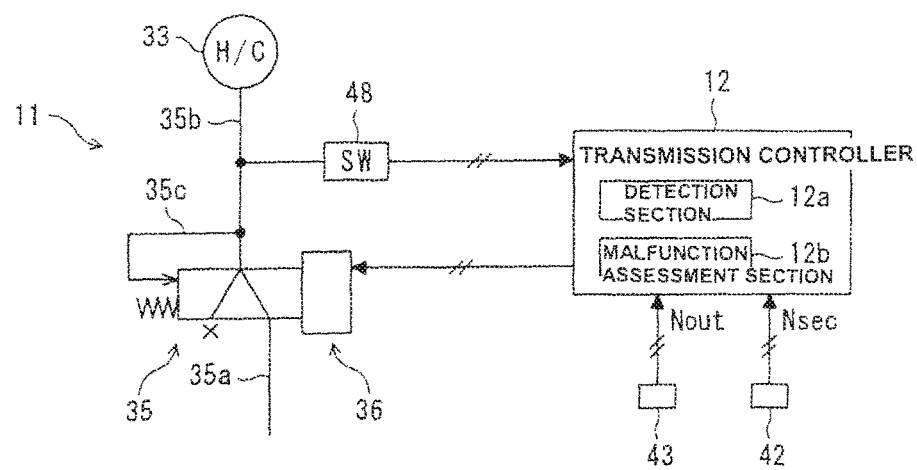
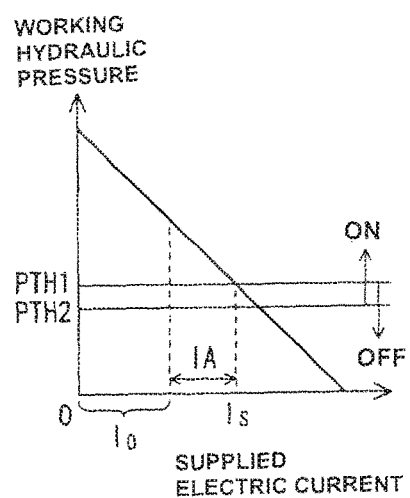
FIG. 3a
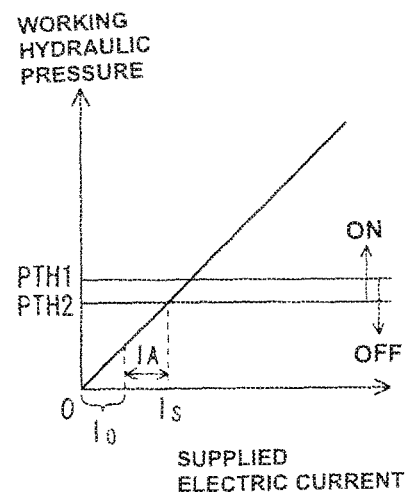
FIG. 3b

HYDRAULIC SWITCH MALFUNCTION ASSESSMENT DEVICE

TECHNICAL FIELD

The present invention relates to a hydraulic switch malfunction assessment device for assessing a malfunction of a hydraulic switch disposed in a hydraulic circuit of an automatic transmission mounted on a vehicle.

BACKGROUND ART

An automatic transmission is often provided with a hydraulic switch, which is disposed in a hydraulic circuit to each frictional engagement element for detecting a working hydraulic pressure supplied to the frictional engagement element. The widely used type of hydraulic switch is an ON-OFF switch, which is configured to output an ON signal when the operating hydraulic pressure exceeds a prescribed threshold value and output an OFF signal when the operating hydraulic pressure is less than the prescribed threshold value. In automatic transmissions, hydraulic pressure control is performed, using the signal from a hydraulic switch. Thus, a hydraulic switch malfunction assessment is executed periodically.

By the way, as is generally known, hydraulic pressure vibration occurs in the hydraulic circuit of an automatic transmission. In the event that the working hydraulic pressure, fluctuating due to such hydraulic pressure vibration (hydraulic pulsation), overlaps with the threshold value for switching between an ON state and an OFF state of the hydraulic switch, an ON state and an OFF state of the signal outputted from the hydraulic switch are undesirably repeated. That is, the "chattering" occurs. When the hydraulic-switch chattering is occurring, there is a possibility that a state of the working hydraulic pressure is erroneously detected, thus exerting a great influence on hydraulic pressure control.

To cope with this, a technology that excludes or eliminates the signal outputted from a hydraulic switch only in an unstable state where the working hydraulic pressure is vibrating or pulsating, has been disclosed. For instance, Patent document 1 teaches a technology in which it is determined that the working hydraulic pressure of a frictional engagement element has reached a target hydraulic pressure, only when the signal from a hydraulic switch has been continuously detected in a temporally continuous state. This permits hydraulic pressure control to be stably performed.

The controller, to which the signal from the hydraulic switch is inputted, is configured to signal-process the signal from the hydraulic switch every predetermined arithmetic operation cycles. Therefore, in the event that hydraulic-switch chattering has occurred due to hydraulic pressure vibration (hydraulic pulsation) occurring in the hydraulic circuit of the automatic transmission, it is difficult to accurately process the signal from the hydraulic switch undesirably chattering, depending on certain timing (at a certain time or time interval) of the hydraulic-switch chattering.

For instance, when the hydraulic switch is repeatedly outputting an On signal and an OFF signal due to chattering, but the period (the time interval) of the ON signal and the OFF signal is shorter than the arithmetic operation cycle of the controller, there is a possibility that the controller erroneously processes that the signal from the hydraulic switch is constantly kept in an OFF state depending on the timing. Therefore, even when the hydraulic switch itself is normal, there is a possibility that it is assessed or determined that a malfunction of the hydraulic switch occurs. Such an erroneous assessment may produce a great influence on hydraulic pressure control of the automatic transmission. Thus, it would be desirable to avoid the erroneous assessment.

As a countermeasure against an erroneous assessment, it is considered to specify a running condition and an operating region in which hydraulic-switch chattering may occur and then inhibit an assessment on a malfunction of the hydraulic switch from being carried out under the specified running condition and/or in the specified operating region. However, there is a possibility that hydraulic pressure vibration (hydraulic pulsation), which may cause chattering, occurs without depending on the specified running condition and/or the specified operating region. Hence, as discussed above, it is difficult to specify a running condition and/or an operating region in which hydraulic pressure vibration is predicted to occur.

CITATION LIST

Patent Literature

Patent document 1: Japanese Patent Provisional Publication No. 2002-089671

SUMMARY OF INVENTION

It is, therefore, in view of the previously-described drawbacks, a specific object of the invention to prevent an erroneous assessment in a hydraulic switch malfunction assessment device. By the way, the object of the invention is not limited to the specific object. As will be appreciated from the following description, providing superior operation and effects introduced by respective elements/configurations of embodiments carried out the invention and described later but not obtained by the prior art may be regarded as other objects of the invention.

(1) A hydraulic switch malfunction assessment device described herein is equipped with a solenoid valve disposed in a hydraulic circuit of an automatic transmission mounted on a vehicle and having a characteristic such that a working hydraulic pressure supplied to a frictional engagement element of the automatic transmission changes due to a change in an electric current supplied to the solenoid valve, a hydraulic switch installed in the hydraulic circuit and interposed between the solenoid valve and the frictional engagement element and configured to output an ON signal when the working hydraulic pressure is higher than or equal to a prescribed threshold value and output an OFF signal when the working hydraulic pressure is less than the prescribed threshold value, a detection means for detecting a state of operation of the solenoid valve, and a malfunction assessment means for assessing a malfunction of the hydraulic switch based on the state of operation of the solenoid valve detected by the detection means and the signal from the hydraulic switch. The malfunction assessment means is configured to control the supplied electric current to a prescribed electric current value or less when a predetermined running condition has been met, and then assess the malfunction of the hydraulic switch.

(2) It is preferable that the above-mentioned prescribed electric current value is preset to an electric current value decreased by a given amount or more from a specific supplied electric current value at which the working hydraulic pressure is brought to the prescribed threshold value by way of the solenoid valve.

(3) Also, it is preferable that the automatic transmission is a continuously variable transmission including a continuously variable speed change mechanism and a sub transmission mechanism arranged in series with the continuously variable speed change mechanism and having a first clutch used for starting and a second clutch having a transmission gear ratio less than the first clutch, each of the clutches serving as the frictional engagement element. In this case, preferably, the predetermined running condition includes a specific operating region that does not interfere with shift control of the sub transmission mechanism, while avoiding an operating region that permits the working hydraulic pressure to be controlled.

(4) It is preferable that the solenoid valve has the characteristic such that the working hydraulic pressure increases, as the supplied electric current decreases. In this case, preferably, the malfunction assessment means assesses that an OFF-malfunction of the hydraulic switch occurs when the signal from the hydraulic switch after the supplied electric current has been controlled to the prescribed electric current value or less, is an OFF signal. By the way, the previously-discussed "OFF-malfunction" means that the hydraulic switch outputs an OFF signal even in the presence of hydraulic-pressure supply (that is, the hydraulic switch stuck in an OFF state).

(5) In lieu thereof, it is preferable that the solenoid valve has the characteristic such that the working hydraulic pressure decreases, as the supplied electric current decreases. In this case, preferably, the malfunction assessment means assesses that an ON-malfunction of the hydraulic switch occurs when the signal from the hydraulic switch after the supplied electric current has been controlled to the prescribed electric current value or less, is an ON signal. By the way, the previously-discussed "ON-malfunction" means that the hydraulic switch outputs an ON signal even in the case of no hydraulic-pressure supply (that is, the hydraulic switch stuck in an ON state).

According to the hydraulic switch malfunction assessment device as set out above, under a specific state where the influence of hydraulic pressure vibration has been excluded by controlling the electric current supplied to the solenoid valve to a prescribed electric current value or less, the malfunction assessment device assesses a malfunction of the hydraulic switch, thus preventing an erroneous assessment.

BRIEF DESCRIPTION OF DRAWINGS

FIG. 2 is a schematic diagram illustrating part of a hydraulic control circuit.

FIGS. 3(a)-3(b) are graphs, each illustrating the relationship between a supplied electric current to a solenoid valve and a working hydraulic pressure, FIG. 3(a) showing a normal-HIGH characteristic, whereas FIG. 3(b) showing a normal-LOW characteristic.

DESCRIPTION OF EMBODIMENTS

Preferred embodiments of the present invention are hereinafter described with reference to the drawings. By the way, the embodiments shown and described hereunder are exemplified only for the purpose of illustration. Accordingly, it is apparent that various changes and modifications may be made or adopted. That is, various changes and modifications, modified from respective elements/configurations of the following embodiments may be made without departing from those purposes. When needed, an appropriate selection and appropriate combination may be made.

[1. Configuration of Device]

Figure 1:
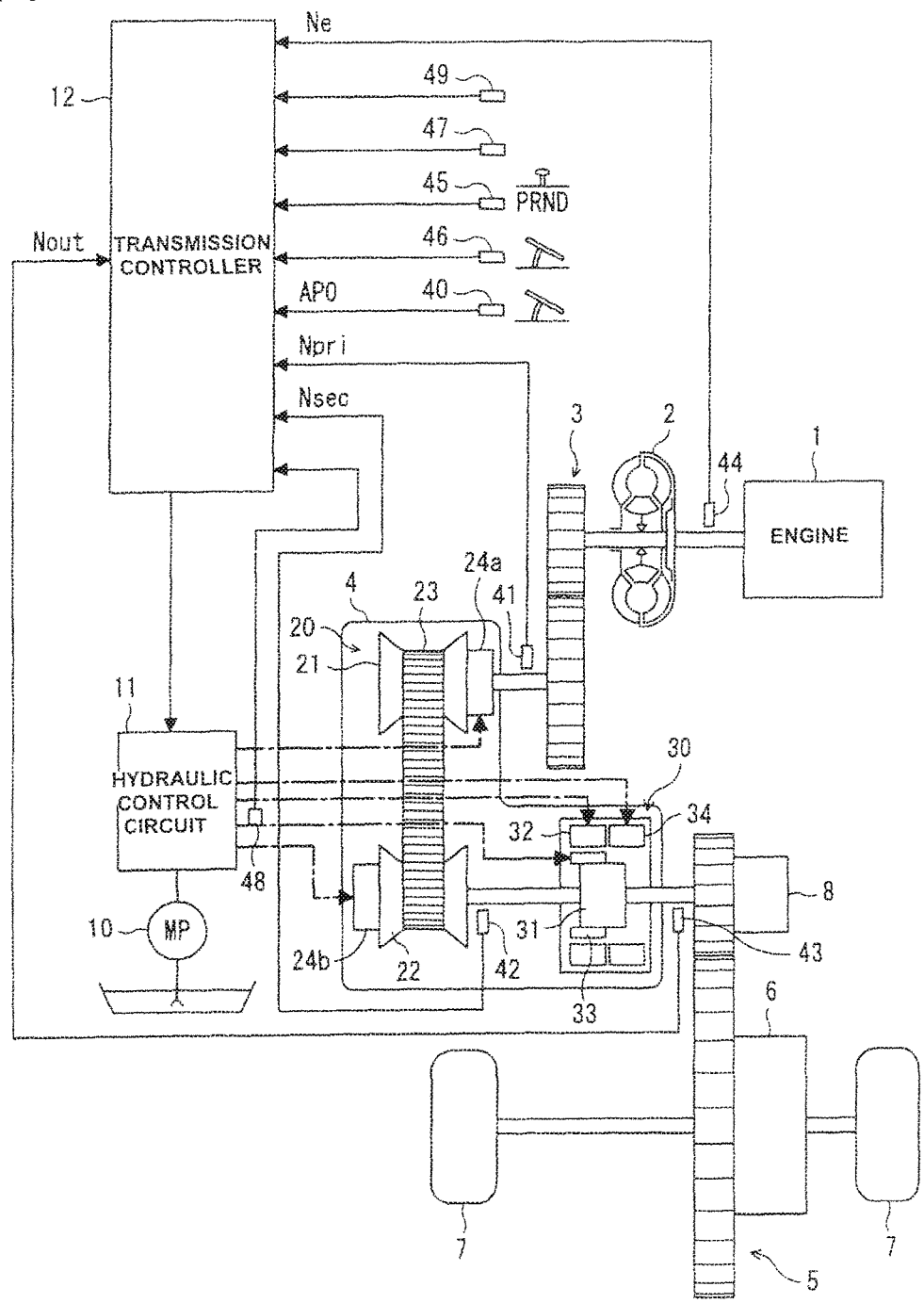
FIG. 1 is a schematic system diagram illustrating a block configuration of of a hydraulic switch malfunction assessment device of one embodiment and a vehicle to which the malfunction assessment device is applied.

FIG. 1 shows the schematic system diagram of a vehicle on which a control device of a stepped transmission mechanism of the embodiment is mounted. As shown in FIG. 1, the vehicle employs an engine (an internal combustion engine) 1 as a driving power source. Output rotation of engine 1 is transmitted through a lockup-clutch equipped torque converter 2, a first gear train 3, a continuously variable transmission 4 (hereinafter referred to simply as "transmission 4"), a second gear train 5, and a final reduction gear 6, to drive road wheels 7. The second gear train 5 is equipped with a parking mechanism 8 for mechanically lock the output shaft of transmission 4 during parking, thereby disabling rotation of the output shaft.

The vehicle is provided with an oil pump 10, which is driven by part of the power of engine 1. The vehicle is further provided with a hydraulic control circuit 11 for regulating hydraulic pressure from the oil pump 10 and for supplying the regulated hydraulic pressure to respective parts of transmission 4, and a transmission controller 12 for controlling the hydraulic control circuit 11 and the like.

Transmission 4 is an automatic transmission including a belt-type continuously variable speed change mechanism 20 (hereinafter referred to as "variator 20"), and a sub transmission mechanism (a stepped transmission mechanism) 30 arranged in series with the variator 20. The "in-series arrangement" means that variator 20 and sub transmission mechanism 30 are connected in series with each other in a power-transmission path from the engine 1 to the drive road wheels 7. Hereupon, sub transmission mechanism 30 is connected directly to the output shaft of variator 20. In lieu thereof, sub transmission mechanism 30 may be connected to the variator 20 by way of other speed change mechanisms and/or other power-transmission mechanisms (for example, other gear trains).

Variator 20 has a continuously variable speed-change function so that a transmission ratio (that is, transmission input rotation speed/transmission output rotation speed) corresponding to a ratio of transmission input rotation speed and transmission output rotation speed is steplessly varied by changing a contact radius of a belt. Variator 20 has a primary pulley 21, a secondary pulley 22, and a V belt 23 wrapped around across these two pulleys 21 and 22.

Primary pulley 21 has a fixed conical plate, a movable conical plate whose sheave surface is arranged to be opposed to the sheave surface of the fixed conical plate to define a V-shaped groove between them, and a hydraulic cylinder 24a. Secondary pulley 22 has a fixed conical plate, a movable conical plate whose sheave surface is arranged to be opposed to the sheave surface of the fixed conical plate to define a V-shaped groove between them, and a hydraulic cylinder 24b. Hydraulic cylinders 24a and 24b are provided on respective back faces of the movable conical plates, for axially moving each of the movable conical plates by adjusting hydraulic pressure (working hydraulic pressure) supplied to each of the hydraulic cylinders. The hydraulic pressures supplied to respective hydraulic cylinders 24a and 24b are controlled by the transmission controller 12. The widths of the V-shaped grooves are changed and thus the contact radii of the V belt 23 with respective pulleys 21-22 are varied, thereby steplessly varying a transmission ratio (a pulley ratio) of the variator 20.

Sub transmission mechanism 30 is a forward two-stage and reverse one-stage stepped transmission mechanism. Sub transmission mechanism 30 is provided with a Ravigneau type planetary gear mechanism 31 in which carriers of two planetary gear mechanisms are coupled with each other, and a plurality of frictional engagement elements 32-34 for changing a linking state (a power-transmission path) among them by controlling engagements (applications) with a plurality of rotating elements constructing the Ravigneau type planetary gear mechanism 31. That is, hydraulic pressures supplied to respective frictional engagement elements 32-34 are adjusted and thus an engagement/disengagement state (an application/release state) of each of frictional engagement elements 32-34 is changed, thereby varying a shift stage of sub transmission mechanism 30.

Hereupon, a Low brake (a first clutch) 32 used for starting, a High clutch (a second clutch) 33 having a transmission gear ratio less than the Low brake 32, and a Reverse brake (abbreviated to "Rev brake") 34 are provided as frictional engagement elements. These frictional engagement elements, namely, Low brake 32, High clutch 33, and Rev brake 34, are configured to produce respective transmitted torques, determined based on the hydraulic pressures (working hydraulic pressures) supplied to the respective elements. These hydraulic pressures, supplied to Low brake 32, High clutch 33, and Rev brake 34, are controlled by the transmission controller 12.

For instance, when Low brake 32 is engaged (applied) and High clutch 33 and Rev brake 34 are both disengaged (released), the shift stage of sub transmission mechanism 30 becomes brought to a first-speed gear. When starting the vehicle, the shift stage of sub transmission mechanism 30 is usually the first speed gear, and thus only the Low brake 32 becomes engaged (applied) during the starting period. Also, when High clutch 33 is engaged and Low brake 32 and Rev brake 34 are both released, the shift stage of sub transmission mechanism 30 becomes brought to a second-speed gear of a transmission gear ratio less than the first-speed gear. Furthermore, when Rev brake 34 is engaged and Low brake 32 and High clutch 33 are both released, the shift stage of sub transmission mechanism 30 becomes brought to a reverse gear.

Hydraulic control circuit 11 is constructed by a plurality of flow Passages (hydraulic circuits) and plurality of hydraulic control valves (solenoid valves, directional control valves and the like) Hydraulic control circuit 11 is configured to switch among hydraulic pressure supply paths by controlling the plurality of hydraulic control valves responsively to a shift control signal from the transmission controller 12, and adjust or regulate hydraulic pressure produced by the oil pump 10 to a desired hydraulic pressure. Thereafter, the regulated hydraulic pressure is supplied to respective parts (hydraulic cylinders 24a, 24b, and frictional engagement elements 32-34) of transmission 4. Thus, the transmission ratio of variator 20 and the shift stage of sub transmission mechanism 30 are varied so as to carry out a shift of transmission 4.

Part of the hydraulic control circuit 11 is shown in FIG. 2. FIG. 2 is a schematic diagram of the hydraulic circuit 35 of High clutch 33. A duty-controlled the hydraulic circuit 35. Solenoid valve 36 is configured to adjust or regulate hydraulic pressure by changing the flow-path opening between a first oil passage 35a and a second oil passage 35b and drain oil so as to relieve the excessive hydraulic pressure.

Solenoid valve 36 has a characteristic such that the hydraulic pressure supplied to High clutch 33 changes due to a change in an electric current supplied to the solenoid valve. Hereupon, as shown in FIG. 3(a), solenoid valve 36 has the characteristic (i.e., a normal-HIGH characteristic) such that the hydraulic pressure supplied to High clutch 33 increases, as the supplied electric current decreases. Thus, when the supplied electric current is zero, the hydraulic pressure becomes a highest pressure value. The supplied electric current to solenoid valve 36 is controlled by the transmission controller 12.

Solenoid valve 36 has a solenoid located at one end, for controlling a pushing force acting in the left direction (viewing FIG. 2) by an electromagnetic force. A biasing force of a coil spring and a feedback pressure from a feedback oil passage 35c branched from the second oil passage 35b, to which the hydraulic pressure after having been regulated by the solenoid valve 36 is supplied, act on the other end of solenoid valve 36.

A hydraulic switch 48 is disposed in the flow-path portion (i.e., the second oil passage 35b) between the High clutch 33 of hydraulic circuit 35 and the solenoid valve 36, for detecting a state of hydraulic pressure supplied to the High clutch 33. Hydraulic switch 48 is an ON-OFF switch, which is configured to output an ON signal when the hydraulic pressure supplied to High clutch 33 is higher than or equal to a prescribed threshold value and output an OFF signal when the supplied hydraulic pressure is less than the prescribed threshold value. Hereupon, a hysteresis is provided at the threshold value. This threshold value is hereinafter referred to as an "ON-OFF switching threshold value of hydraulic switch 48".

That is to say, as regards the ON-OFF switching threshold value, a first threshold value PTH1 used when hydraulic switch 48 is OFF and a second threshold value PTH2 used when hydraulic switch 48 is ON are provided. The magnitude relation of the first threshold value PTH1 and the second threshold value PTH2 has a relation defined by PTH1>PTH2. Hydraulic switch 48 is configured to switch from OFF to ON when the hydraulic pressure reaches the first threshold value PTH1 due to a rise in the hydraulic pressure. The hydraulic switch is further configured to switch from ON to OFF when the hydraulic pressure falls below the second threshold value PTH2 due to a fall in the hydraulic pressure. The signal outputted from hydraulic switch 48 is inputted to the transmission controller 12.

By the way, in the shown embodiment, as regards the ON-OFF switching threshold value, two threshold values, namely, the first threshold value PTH1 and the second threshold value PTH2 are exemplified. In lieu thereof, only one threshold value may be used as an ON-OFF threshold value. That is, a threshold value (an OFF→ON threshold value) used when hydraulic switch 48 is OFF and a threshold value (an ON→OFF threshold value) used when hydraulic switch 48 is ON may be set to be identical to each other.

In a similar manner to the above, a duty-controlled type solenoid valve for use in Low brake 32 is disposed in a hydraulic circuit (not shown) of Low brake 32. A hydraulic switch is disposed between the solenoid valve and the Low brake 32. In contrast to the solenoid valve 36 for use in High clutch 33, as shown in FIG. 3(b) the solenoid valve for use in the Low brake has a characteristic (i.e., a normal-LOW characteristic) such that the hydraulic pressure supplied to the Low brake decreases, as the supplied electric current decreases. Thus, when the supplied electric current is zero, the hydraulic pressure becomes a lowest pressure value. The supplied electric current to the solenoid valve for use in the Low brake is controlled by the transmission controller 12.

Transmission controller 12 is a computer employing a central processing unit (CPU) for performing various kinds of arithmetic processing, a random access memory (ROM) in which programs and arithmetic operation data needed for control processing are stored, input/output ports for inputting and outputting informational signals from and to the outside, and a timer for time count, and the like. As shown in FIG. 1, various sensors and switches, that is, an accelerator opening sensor 40, a primary rotation speed sensor 41, a secondary rotation speed sensor 42, an output rotation sensor 43, an engine speed sensor 44, an inhibitor switch 45, a brake switch 46, a longitudinal G sensor 47, the hydraulic switch 48, an oil temperature sensor 49 and the like, are connected to the transmission controller 12, for receiving sensor information and switch information detected by these sensors and switches.

Accelerator opening sensor 40 detects a depression amount (accelerator opening APO) of an accelerator pedal (not shown). Accelerator opening APO is a parameter corresponding to a driver's intention for accelerating or starting. Primary rotation speed sensor 41 detects a rotation speed Npri of primary pulley 21 (i.e., input rotation speed of transmission 4). Secondary rotation speed sensor 42 detects a rotation speed Nsec of secondary pulley 22 (i.e., input rotation speed of sub transmission mechanism 30).

Output rotation sensor 43 detects a rotation speed of the output shaft of transmission 4 as an output rotation speed Nout. An output rotation speed Nout of sub transmission mechanism 30 is acquired by means of the output rotation sensor 43. Engine speed sensor 44 is configured to detect revolutions of a crankshaft per unit time as an engine speed Ne. Inhibitor switch 45 detects a position (a range position) of a shift lever (a select lever) selected by the driver, for outputting a range position signal corresponding to the selected range position.

Brake switch 46 is an ON-OFF switch, which detects a state of depression of a foot brake. For instance, when the brake fluid pressure is higher than or equal to a predetermined threshold value $PB_{TH}$ (that is, in the case of a large brake leg-power), brake switch 46 outputs an ON signal. Conversely when the brake fluid pressure is less than the predetermined threshold value $PB_{TH}$ (that is, in the case of a small brake leg-power), the brake switch outputs an OFF signal. Longitudinal G sensor 47 is a vehicle sensor configured to detect a longitudinal G (a longitudinal acceleration) acting on the vehicle in the longitudinal direction. The inclination of the vehicle and vehicle behavior are computed or calculated, using the output signal from the longitudinal G sensor 47.

As discussed previously, hydraulic switch 48 is an ON-OFF switch configured to detect a state of working hydraulic pressure supplied to the High clutch 33. Oil temperature sensor 49 detects a temperature of oil (an oil temperature). The oil temperature has an influence on a viscosity of oil. Thus, by the use of oil temperature sensor 49, a check is made to determine whether the oil temperature has not yet reached oil temperature such that oil pump 10 can be properly operated.

A control program and the like needed for controlling sub transmission mechanism 30 are stored in the ROM of transmission controller 12. The CPU is configured to read out the control program stored in the ROM for carrying out the control program, and perform various kinds of arithmetic processing for various signals sent or inputted via the input port (the input interface) so as to generate a control signal, and output the generated control signal via the output port (the output interface) to the hydraulic control circuit 11. Various values used for arithmetic operations executed within the CPU and the results of ongoing arithmetic calculations are properly stored in the RAM.

As concrete controlled systems of transmission controller 12, line pressure control by which a target line pressure is acquired depending on throttle opening and the like, and shift control of variator 20 and shift control of sub transmission mechanism 30, both based on operating conditions of the vehicle, and the like are enumerated. In the shown embodiment, shift control, executed by transmission controller 12, is hereunder explained in reference to the shift map shown and exemplified in FIG. 4. Additionally, details of a malfunction assessment executed for assessing a malfunction of hydraulic switch 48 are hereunder described.

[2. Summary of Control]
[2-1. Shift Control]

Figure 4:
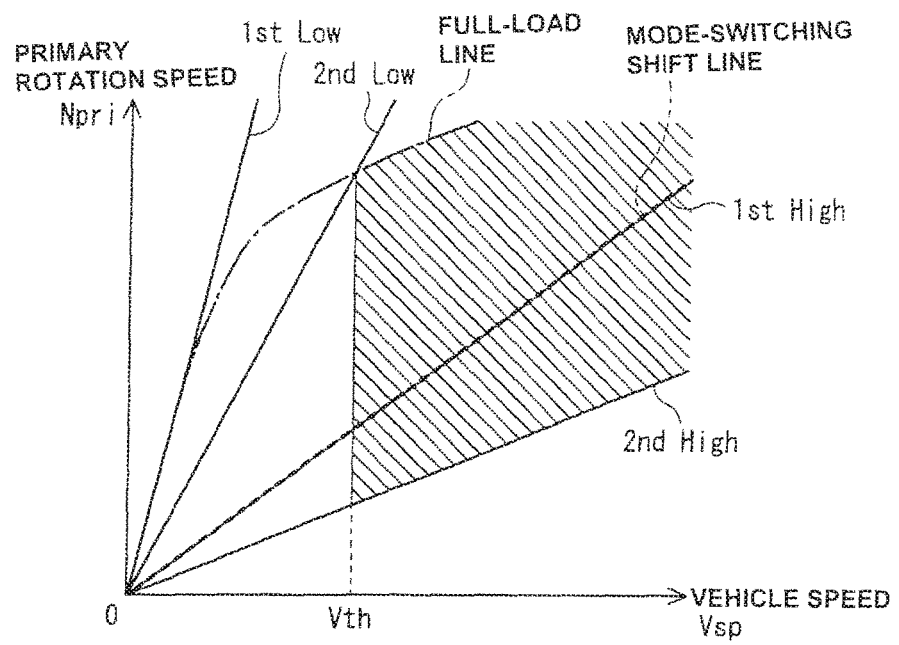
FIG. 4 is one example of a shift map.

FIG. 4 shows one example of the shift map stored in the ROM of transmission controller 12. Transmission controller 12 controls shifting of variator 20 and changing of the shift stage of sub transmission mechanism 30, using the shift map.

FIG. 4 is the shift map in which the axis of abscissa represents vehicle speed Vsp calculated or derived from output rotation speed Nout, whereas the axis of ordinate represents primary rotation speed Npri. An operating point of transmission 4 is defined by both vehicle speed Vsp and primary rotation speed Npri. The gradient of a line connecting an operating point of transmission 4 and a zero point of the lower left corner of the shift map corresponds to a transmission ratio of transmission 4 (an overall transmission ratio obtained by multiplying a transmission ratio (a pulley ratio) of variator 20 with a transmission gear ratio corresponding to a shift stage of sub transmission mechanism 30, the overall transmission ratio hereinafter referred to as "through transmission ratio").

On this shift map, a shift line is set for every accelerator opening APO. A shift of transmission 4 is performed in accordance with a shift line selected based on accelerator opening APO. For the sake of simplicity, the map of FIG. 4 shows only a full-load shift line indicated by one-dotted line. With the sub transmission mechanism 30 in first-speed gear, transmission 4 can be shifted between a 1st-Low line (a low-speed mode lowest line) obtained by setting the transmission ratio of variator 20 at the lowest speed ratio (that is, the maximum transmission ratio) and a 1st-High line (a low-speed mode highest line) obtained by setting the transmission ratio of variator 20 at the highest speed ratio (that is, the minimum transmission ratio).

On the other hand, with the sub transmission mechanism 30 in second-speed gear, transmission 4 can be shifted between a 2nd-Low line (a high-speed mode lowest line) obtained by setting the transmission ratio of variator 20 at the lowest speed ratio and a 2nd-High line (a high-speed mode highest line) obtained by setting the transmission ratio of variator 20 at the highest speed ratio. Regarding the transmission gear ratio of each shift stage of sub transmission mechanism 30, the transmission gear ratio corresponding to the 1st-High line is set less than the transmission gear ratio corresponding to the 2nd-Low line. Therefore, a range of the through transmission ratio of transmission 4 obtained with the sub transmission mechanism 30 in first-speed gear and a range of the through transmission ratio of transmission 4 obtained with the sub transmission mechanism 30 in second-speed gear overlap with each other. Hence, when the operating point of transmission 4 exists within this overlapping range, either of the first-speed shift stage and the second-speed shift stage is selectable in the transmission 4.

On this shift map, as indicated by the heavy broken line in FIG. 4, the mode-switching shift line for shifting of sub transmission mechanism 30 is set to be almost overlaid on the 1st-High line. That is, the through transmission ratio corresponding to the mode-switching shift line is set to be approximately equal to the transmission ratio corresponding to the 1st-High line. When the operating point of transmission 4 passes across the mode-switching shift line due to an increase in vehicle speed Vsp during running at first-speed gear, the shift stage of sub transmission mechanism 30 is switched from first-speed gear to second-speed gear.

However, sub transmission mechanism 30 is maintained in second-speed gear and shift operation of transmission 4 is performed by shifting the variator 20 alone, except that the operating mode of transmission 4 has passed across the mode-switching shift line due to a decrease in vehicle speed Vsp during running at second-speed gear, but there is a need of a large magnitude of driving force that cannot be obtained by second-speed gear.

[2-2. Malfunction Assessment]

Transmission controller 12 of the embodiment is configured to assess a malfunction of hydraulic switch 48 based on a state of operation of solenoid valve 36 and a signal from hydraulic switch 48. Hereupon, an OFF-malfunction assessment of hydraulic switch 48 that detects a state of working hydraulic pressure supplied to the High clutch 33 as shown in FIG. 2 is hereunder explained. By the way, the "OFF-malfunction" means that hydraulic switch 48 outputs an OFF signal even in the presence of hydraulic-pressure supply (that is, the hydraulic switch stuck in an OFF state).

A malfunction assessment is performed as follows. First, the electric current supplied to solenoid valve 36 is controlled to a prescribed electric current value $I_0$ or less when a predetermined running condition has been met. Then, the malfunction assessment is performed, using the signal from hydraulic switch 48 after the supplied electric current has been controlled to the prescribed electric current value or less. The prescribed electric current value $I_0$ is preset to an electric current value decreased by a given amount IA or more from a specific supplied electric current value $I_s$ at which the working hydraulic pressure is brought to the ON-OFF switching threshold value by way of the solenoid valve 36. The specific supplied electric current value $I_s$ for bringing to the ON-OFF switching threshold value is equivalent to a supplied electric current to solenoid valve 36 corresponding to the ON-OFF switching threshold hydraulic pressure of hydraulic switch 48.

Hereupon, a hysteresis is provided at the ON-OFF switching threshold value. Hence, the electric current value corresponding to a selected one (that is, the first threshold value PTH1 in case of the normal-HIGH characteristic, and the second threshold value PTH2 in case of the normal-LOW characteristic) of the two threshold values at which the supplied electric current value is relatively small is set to the "specific supplied electric current value $I_s$ for bringing to the ON-OFF switching threshold value". Also, the given amount IA is set to an amount which cannot be affected by chattering when executing a malfunction assessment, and also set depending on the amplitude of hydraulic pressure vibration. That is to say, as shown in FIGS. 3(*a*) and 3(*b*), the prescribed electric current value $I_0$ is preset to an electric current value decreased by the given amount IA or more from the specific supplied electric current value $I_s$.

In the shown embodiment, the prescribed electric current value $I_0$ is preset to an electric current value such that the hydraulic pressure supplied to High clutch 33 becomes sufficiently higher than the ON-OFF switching threshold value of hydraulic switch 48. Hereupon, the prescribed electric current value is preset to zero (0mA). When the supplied electric current to solenoid valve 36 is controlled to zero, hydraulic pressure vibration (hydraulic pulsation) in the hydraulic circuit 35 can be suppressed. Furthermore, in the case that the supplied electric current is zero, hydraulic pressure is always supplied to the High clutch 33, and thus the High clutch 33 is kept engaged.

Therefore, in the case that the supplied electric current has been controlled to zero, hydraulic switch 48 is not affected by hydraulic pressure vibration and thus the hydraulic switch 48 necessarily outputs an ON signal when the hydraulic switch is normal. In contrast, in the event that hydraulic switch 48 has outputted an OFF signal, there is a discrepancy between the signal from hydraulic switch 48 and the state of operation of solenoid valve 36, and hence it is determined that an OFF-malfunction of hydraulic switch 48 occurs.

A predetermined running condition for executing a malfunction assessment includes a specific operating region that does not interfere with shift control of sub transmission mechanism 30, while avoiding an operating region that permits the working hydraulic pressure of High clutch 33 to be controlled. As a predetermined running condition for executing a malfunction assessment, at least a condition "A" and a condition "B", hereunder enumerated, have to be met.

Condition "A": the shift stage of sub transmission mechanism 30 is the second-speed gear; and Condition "B": vehicle speed Vsp is greater than or equal to a predetermined vehicle speed Vth.

When the electric current supplied to solenoid valve 36 is controlled to zero, the hydraulic pressure supplied to High clutch 33 becomes a highest pressure value. In other words, during running with the sub transmission mechanism 30 in second-speed gear, High clutch 33 has already been engaged and thus it is possible to control the supplied electric current to zero. A check is made to determine, based on the signal from transmission controller 12 to hydraulic control circuit 11, if the previously-discussed condition "A" is met.

Also, the condition "B" is a condition needed to determine whether the current running condition is a running condition in which sub transmission mechanism 30 cannot be shifted from second-speed gear to first-speed gear. When a demand for accelerating by the driver has rapidly increased, a large magnitude of torque is required. In such a case, sub transmission mechanism 30 may be downshifted from second-speed gear to first-speed gear. As discussed above, when executing shift control from second-speed gear to first-speed gear, the supplied electric current to solenoid valve 36 has to be more accurately finely controlled. Conversely when there is not much demand for accelerating, it is possible to continue running in second-speed gear. The predetermined vehicle speed Vth of the condition "B" is preset to a speed value (for example, 60 km/h) that is considered to permit running in second-speed gear.

The running condition for executing a malfunction assessment (that is, a specified range within which the previously-discussed conditions "A" and "B" are met) is indicated by the diagonal shading area in the map of FIG. 4 That is, when the operating point of transmission 4 exists within the diagonal shading area of the map, the supplied electric current to solenoid valve 36 is controlled to zero, and then a malfunction assessment of hydraulic switch 48 is carried out.

[3. Control Configuration]

As shown in FIG. 2, as components needed for executing a malfunction assessment as discussed above, transmission controller 12 is provided with a detection section 12a and a malfunction assessment section 12b. Each of the components can be realized by an electronic circuit (a hardware). Alternatively, each of these components may be programmed as a software. In lieu thereof, a part of functions performed by the elements may be constructed by a hardware, while the other may be constructed by a software. By the way, the shift control itself is conventional and forms no part of the invention, typical details of such shift control being set forth, for example, in U.S. Pat. No. 8,712,649 (corresponding to JP4923080), the teachings of which are hereby incorporated by reference. Thus, details of a malfunction assessment are hereinafter described.

Detection section (detection means) 12a is provided for detecting a state of operation of solenoid valve 36. For instance, detection section 12a is configured to detect a shift stage of sub transmission mechanism 30, checking the signal outputted from the transmission controller 12, and determine, based on the detected shift stage, an engaged state of each of frictional engagement elements 32, 33, thereby detecting the state of operation of solenoid valve 36.

Subsequently to the above, detection section 12a detects or determines that solenoid valve 36 is in a state where high hydraulic pressure is supplied to the High clutch 33 by way of the solenoid valve, when the detected shift stage of sub transmission mechanism 30 is the second-speed gear and thus High clutch 33 can be regarded as to be engaged. Conversely when the detected shift stage of sub transmission mechanism 30 is the first-speed gear and thus High clutch 33 can be regarded as to be released, the detection section detects or determines that solenoid valve 36 is in a state where hydraulic pressure is not supplied to the High clutch 33 by way of the solenoid valve. Information about the state of operation of solenoid valve 36 and the shift stage of sub transmission mechanism 30, detected by the detection section 12a, is transmitted to the malfunction assessment section 12b.

Malfunction assessment section 12b is configured to execute a malfunction assessment of hydraulic switch 48, based on information from output rotation sensor 43 and hydraulic switch 48 and information sent or transmitted from the detection section 12a. Within the malfunction assessment section 12b, first of all, a check is made to determine whether a specific situation where a malfunction assessment is executable is met. Hereupon, a check is made to determine whether the previously-discussed conditions "A" and "B" are both met. By the way, the condition "A" is determined based on the shift stage detected by the detection section 12a, whereas the condition "B" is determined based on the vehicle speed Vsp calculated or derived from the output rotation speed Nout detected by the output rotation sensor 43.

Malfunction assessment section 12b is configured to control the supplied electric current to solenoid valve 36 to zero, when it is determined that the conditions "A" and "B" have been met. Hence, high hydraulic pressure is supplied to the High clutch 33 and thus the shift stage of sub transmission mechanism 30 is kept in second-speed gear. When the signal from hydraulic switch 48 after the supplied electric current has been controlled to zero is ON, malfunction assessment section 12b determines that hydraulic switch 48 is normal. Conversely when the signal from hydraulic switch 48 after the supplied electric current has been controlled to zero is OFF, the malfunction assessment section determines that an OFF-malfunction of the hydraulic switch occurs.

On the other hand, when it is determined that at least one of the conditions "A" and "B" has not been met, malfunction assessment section 12b determines that a malfunction assessment should not be executed at the current cycle. The routine for determining as discussed above is repeatedly executed until such time that the conditions "A" and "B" have been both met.

The result of the malfunction assessment of hydraulic switch 48 executed within malfunction assessment section 12b is stored in the transmission controller 12. For instance, when it is determined that an OFF-malfunction occurs, a malfunction code corresponding to a malfunction of hydraulic switch 48 is stored in thetransmission controller 12. Additionally, it will be appreciated that the system configuration may be modified so as to warn or inform the driver of such a malfunction.

[4. Flowchart]

Figure 5:
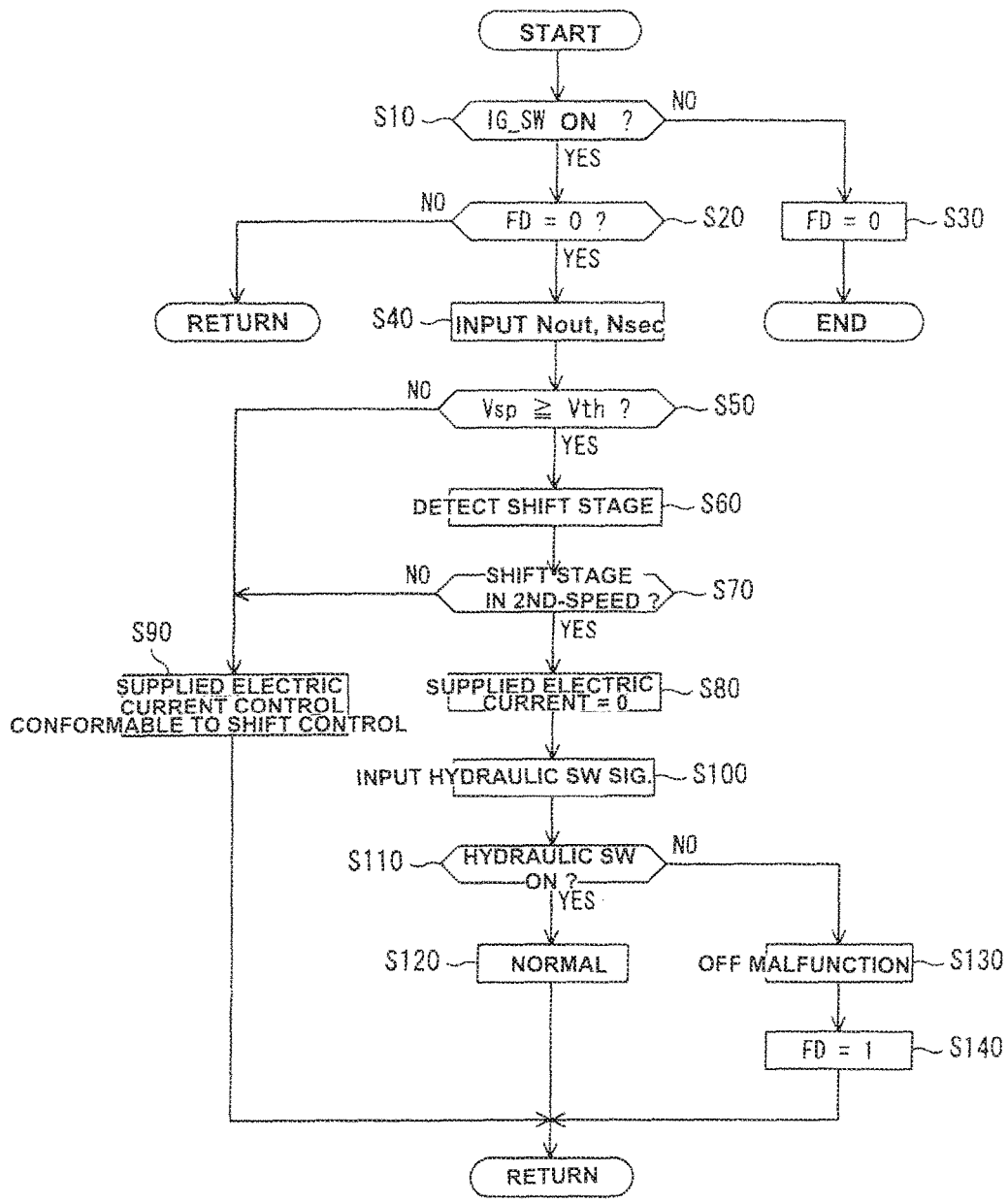
FIG. 5 is an exemplified flowchart used for a malfunction assessment executed within the malfunction assessment device of the embodiment.

Procedures of assessment on a malfunction of hydraulic switch 48, executed within transmission controller 12, are hereunder explained and exemplified in reference to FIG. 5. The flowchart of FIG. 5 is repeatedly executed every predetermined operation time periods (every predetermined operation cycles), immediately when an ignition key switch (IG_SW) is turned ON.

At step S10, a check is made to determine whether the ignition key switch is turned ON (that is, whether the ignition key switch is continuously kept in its turned-ON state). In other words, when the ignition key switch is not turned OFF, the routine proceeds to step S20, and then a check is made to determine whether a flag FD is reset to "0" (i.e., FD=0). Hereupon, the flag FD is a variable used for checking whether it has been determined that an OFF-malfunction of hydraulic switch 48 occurs. FD=0 corresponds to a situation where it has been determined that the hydraulic switch 48 is normal. FD=1 corresponds to a situation where it has been determined that an OFF-malfunction of hydraulic switch 48 occurs.

During the initial operation time period, the flag FD is reset to "0" (i.e., FD=0). Thus, at the subsequent step S40, output rotation speed Nout, detected by output rotation sensor 43, and secondary rotation speed Nsec, detected by secondary rotation speed sensor 42, are inputted or read. At step S50, a check is made to determine whether vehicle speed Vsp, calculated from the output rotation speed Nout, is greater than or equal to a predetermined vehicle speed Vth. This check corresponds to the previously-discussed condition "B". When vehicle speed Vsp is less than the predetermined vehicle speed Vth, the routine proceeds to step S90 where supplied electric current control, conformable to normal shift control, is executed, and then the current operation cycle is returned.

On the other hand, when vehicle speed Vsp is greater than or equal to a predetermined vehicle speed Vth, the routine proceeds to step S60 where the shift stage of sub transmission mechanism 30 is detected. Thereafter, at step S70, a check is made to determine whether the detected shift stage is the second-speed gear. This check corresponds to the previously-discussed condition "A". When the shift stage is the second-speed gear, the routine proceeds to step S80. Conversely when the shift stage is not the second-speed gear (that is, the shift stage is the first-speed gear), the routine proceeds to step S90 where the previously-discussed control is executed, and then the current operation cycle is returned.

At step S80, the supplied electric current to solenoid valve 36 is controlled to zero. At the subsequent step S100, the signal from hydraulic switch 48 is inputted. Furthermore, at step S110, a check is made to determine whether the signal from hydraulic switch 48 is ON.

When hydraulic switch 48 outputs an ON signal, the routine proceeds to step S120 where it is determined that the hydraulic switch is normal, and then the current operation cycle is returned. Conversely when hydraulic switch 48 outputs an OFF signal, the routine proceeds to step S130 where it is determined that an OFF-malfunction of hydraulic switch 48 occurs. Thereafter, the routine proceeds to step S140. At step S140, the flag FD is set to "1" (i.e., FD=1), and then the current operation cycle is returned.

When the operation cycle has been returned, the routine (the arithmetic operation processing) is repeated from step S10 again. Hence, when the flag FD has been set (FD=1) through step S140, the routine proceeds from step S20 to a No route (a negative-answer route), and thus this operation cycle is returned. By the way, in this case, exclusive hydraulic control, conformable to a specific situation where hydraulic switch 48 is regarded as to be in an OFF-malfunction state, is executed (that is, hydraulic control dedicated to an OFF-malfunction is executed).

In contrast, when the ignition key switch is turned OFF, the routine proceeds from step S10 to step S30 where the flag FD is reset (i.e., FD=0). This control flow terminates.

[5. Effects]

Therefore, according to the hydraulic switch malfunction assessment device of the embodiment, the device is configured to control the electric current supplied to solenoid valve 36 to the prescribed electric current value $I_0$ or less when the predetermined running condition has been met, and assess a malfunction of hydraulic switch 48 under a specific state where the influence of hydraulic pressure vibration has been excluded.

The prescribed electric current value $I_0$ is preset to an electric current value decreased by the given amount IA or more from the specific supplied electric current value $I_s$ at which the working hydraulic pressure supplied to frictional engagement element 33 is brought to the ON-OFF switching threshold value of hydraulic switch 48 by way of the solenoid valve 36. Therefore, when executing a malfunction assessment, it is possible to certainly exclude the influence of hydraulic pressure vibration, thereby preventing an erroneous assessment. In particular, in the embodiment as discussed previously, the setting of prescribed electric current value $I_0$ to zero contributes to the simplified control configuration.

Additionally, the predetermined running condition for executing a malfunction assessment includes a specific operating region that does not interfere with shift control of sub transmission mechanism 30, while avoiding an operating region that permits the working hydraulic pressure of frictional engagement element 33 to be controlled. By virtue of execution of a malfunction assessment within the previously-noted specific operating region, it is possible to more accurately perform the malfunction assessment without exerting an influence on the driving performance and driving feel.

Hereupon, through the use of the solenoid valve 36 having a characteristic such that the working hydraulic pressure increases, as the supplied electric current decreases, it is determined, by virtue of the supplied electric current to the prescribed electric current value $I_0$ or less, whether or not an OFF-malfunction occurs. In the case of the solenoid valve 36 having the normal-HIGH characteristic as discussed above, high working hydraulic pressure is always supplied to frictional engagement element 33 by controlling the supplied electric current to the prescribed electric current value $I_0$ or less, and thus the supplied hydraulic pressure can be kept higher than the ON-OFF switching threshold value of hydraulic switch 48. Therefore, even when hydraulic pressure vibration occurs, the working hydraulic pressure becomes kept higher than the ON-OFF switching hydraulic pressure of hydraulic switch 48. Hence, it is possible to assess a malfunction of hydraulic switch 48, excluding the influence of hydraulic pressure vibration. Therefore, it is possible to improve the malfunction assessment accuracy.

[6. Others]

While the foregoing is a description of the device of the embodiments carried out the invention, it will be understood that the invention is not limited to the embodiments shown and described herein, but that various changes and modifications may be made without departing from the scope or spirit of this invention.

Previously explained in the embodiment is a malfunction assessment of hydraulic switch 48, which is disposed in the hydraulic circuit 35, the hydraulic switch malfunction assessment being carried out after having properly controlled an electric current supplied to solenoid valve 36 disposed in the hydraulic circuit 35 of High clutch 33 and having a normal-HIGH characteristic. A malfunction assessment of the hydraulic switch disposed in the hydraulic circuit of Low brake 32 can be performed in the same manner as discussed previously.

In contrast to the solenoid valve 36, for instance, as shown in FIG. 3(b), the solenoid valve disposed in the hydraulic circuit of Low brake 32 has a characteristic (i.e., a normal-LOW characteristic) such that the hydraulic pressure decreases, as the supplied electric current decreases. Thus, when the supplied electric current is zero, the hydraulic pressure becomes zero. That is, in the case of the solenoid valve having the normal-LOW characteristic, the working hydraulic pressure supplied to Low brake 32 becomes zero by controlling the supplied electric current to zero, and thus Low brake 32 is released.

For the reasons discussed above, when the previously-discussed conditions "A" and "B" are both met, and the hydraulic switch, which is disposed in the hydraulic circuit of Low brake 32, outputs an ON signal after the supplied electric current to the solenoid valve for use in Low brake 32 has been controlled to zero, it is determined that an ON-malfunction of the hydraulic switch occurs. By the way, the previously-discussed "ON-malfunction" means that the hydraulic switch outputs an ON signal even in the case of no hydraulic-pressure supply (that is, the hydraulic switch stuck in an ON state).

That is, it is possible to execute an ON-malfunction assessment of the hydraulic switch disposed in the hydraulic circuit of Low brake 32, simultaneously with an OFF-malfunction assessment of hydraulic switch 48 disposed in the hydraulic circuit 35 of High clutch 33. Also, in the case of an ON-malfunction assessment, even when hydraulic pressure vibration occurs, the working hydraulic pressure becomes kept lower than the ON-OFF switching hydraulic pressure of the hydraulic switch. Hence, it is possible to assess an ON-malfunction of the hydraulic switch, excluding the influence of hydraulic pressure vibration. Therefore, it is possible to improve the malfunction assessment accuracy.

By the way, when the previously-discussed condition "A" is met, that is, when the shift stage of sub transmission mechanism 30 is the second-speed gear, Low brake 32 is in its released state, and thus it is determined that the current operating region is a specific operating region that avoids an operating region that permits the working hydraulic pressure of Low brake 32 to be controlled. That is, when at least the condition "A" and the condition "B" are both met, the current operating region can be regarded as to be equivalent to a specific operating region that does not interfere with shift control of sub transmission mechanism 30, while avoiding an operating region that permits the working hydraulic pressure of Low brake 32 to be controlled. Thus, at this time, it is possible to carry out an ON-malfunction assessment of the hydraulic switch on the side of Low brake 32.

Also, regarding the supplied electric current control, the setting of prescribed electric current value $I_0$ to zero is exemplified. It will be understood that the prescribed electric current value $I_0$ is not limited to the setting to zero, but as shown in FIGS. 3(*a*)-3(*b*), preferably, the prescribed electric current value $I_0$ may be set to an electric current value decreased by a given amount IA or more from a specific supplied electric current value $I_s$ at which the working hydraulic pressure supplied to the frictional engagement element is brought to the ON-OFF switching threshold value of hydraulic switch 48.

The method to detect a state of operation of solenoid valve 36 is not limited to the detection method as described previously. In lieu thereof, a sensor, which is configured to directly detect a pressure value of working hydraulic pressure, may be provided for detecting a state of operation of solenoid valve 36.

Also, in the shown embodiment, as an automatic transmission, continuously variable transmission 4 including variator 20 and sub transmission mechanism 30 is exemplified and explained. The automatic transmission is not limited to the continuously variable transmission. In lieu thereof, a multi-stage automatic transmission may be used.

Additionally, in the shown embodiment, sub transmission mechanism 30, which is a forward two-stage and reverse one-stage stepped transmission mechanism, is exemplified. In lieu thereof, a stepped transmission mechanism having three or more forward-speed frictional engagement elements may be used. Furthermore, in the shown embodiment, as a stepped transmission mechanism, a Ravigneau type planetary gear mechanism 31 is used. Various types of stepped transmission mechanisms having different configurations/constructions, such as various types of planetary gear mechanisms, may be used. By the way, a driving power source is not limited to the engine 1. For instance, an electric motor may be used as a driving power source.

The invention claimed is:

1. A hydraulic switch malfunction assessment device comprising:
 a solenoid valve disposed in a hydraulic circuit of an automatic transmission mounted on a vehicle and having a characteristic such that a working hydraulic pressure supplied to a frictional engagement element of the automatic transmission changes due to a change in an electric current supplied to the solenoid valve;
 a hydraulic switch installed in the hydraulic circuit and interposed between the solenoid valve and the frictional engagement element and configured to output an ON signal when the working hydraulic pressure is higher than or equal to a prescribed threshold value and output an OFF signal when the working hydraulic pressure is less than the prescribed threshold value;
 a controller programmed to
  detect a state of operation of the solenoid valve;
  assess a malfunction of the hydraulic switch based on the state of operation of the solenoid valve detected by the controller and the signal from the hydraulic switch, and
 control the electric current supplied to the solenoid valve to a prescribed electric current value or less when a predetermined running condition has been met during running of the vehicle, and then assess the malfunction of the hydraulic switch, which detects the working hydraulic pressure.

2. The hydraulic switch malfunction assessment device as recited in claim 1, wherein:
 the prescribed electric current value is preset to an electric current value decreased by a given amount or more from a specific supplied electric current value at which the working hydraulic pressure is brought to the prescribed threshold value by way of the solenoid valve.

3. The hydraulic switch malfunction assessment device as recited in claim 1, wherein:
 the automatic transmission is a continuously variable transmission including a continuously variable speed change mechanism and a sub transmission mechanism arranged in series with the continuously variable speed change mechanism and having a first clutch used for starting and a second clutch having a transmission gear ratio less than the first clutch, each of the clutches serving as the frictional engagement element; and
 the predetermined running condition includes a specific operating region that does not interfere with shift control of the sub transmission mechanism, while avoiding an operating region that permits the working hydraulic pressure to be controlled.

4. The hydraulic switch malfunction assessment device as recited in claim 1, wherein:
 the solenoid valve has the characteristic such that the working hydraulic pressure increases, as the electric current supplied to the solenoid valve decreases; and
 the controller is programmed to assess that an OFF-malfunction of the hydraulic switch occurs when the signal from the hydraulic switch after the electric current supplied to the solenoid valve has been controlled to the prescribed electric current value or less is the OFF signal.

5. The hydraulic switch malfunction assessment device as recited in claim 1, wherein:
 the solenoid valve has the characteristic such that the working hydraulic pressure decreases, as the electric current supplied to the solenoid valve decreases; and
 the controller is programmed to assess that an ON-malfunction of the hydraulic switch occurs when the signal from the hydraulic switch after the electric current supplied to the solenoid valve has been controlled to the prescribed electric current value or less is the ON signal.

* * * * *